(12) United States Patent
Natanzon et al.

(10) Patent No.: US 11,080,148 B2
(45) Date of Patent: Aug. 3, 2021

(54) METHOD AND SYSTEM FOR STAR REPLICATION USING MULTIPLE REPLICATION TECHNOLOGIES

(71) Applicant: EMC IP Holding Company LLC, Hopkinton, MA (US)

(72) Inventors: Assaf Natanzon, Tel Aviv (IL); Saar Cohen, Moshav (IL); Anestis Panidis, Saratoga, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/589,486

(22) Filed: Oct. 1, 2019

(65) Prior Publication Data

US 2020/0034249 A1 Jan. 30, 2020

Related U.S. Application Data

(63) Continuation of application No. 15/586,329, filed on May 4, 2017, now Pat. No. 10,430,290, which is a continuation of application No. 14/584,240, filed on Dec. 29, 2014, now Pat. No. 9,672,117.

(51) Int. Cl.
*G06F 11/00* (2006.01)
*G06F 11/14* (2006.01)
*G06F 11/20* (2006.01)

(52) U.S. Cl.
CPC ...... *G06F 11/1464* (2013.01); *G06F 11/1451* (2013.01); *G06F 11/1453* (2013.01); *G06F 11/2069* (2013.01); *G06F 11/2074* (2013.01); *G06F 11/2076* (2013.01); *G06F 2201/815* (2013.01); *G06F 2201/84* (2013.01); *G06F 2201/855* (2013.01)

(58) Field of Classification Search
None
See application file for complete search history.

(56) References Cited

U.S. PATENT DOCUMENTS

| | | |
|---|---|---|
| 7,406,487 B1 | 7/2008 | Gupta |
| 9,003,374 B2 | 4/2015 | Ngo |
| 9,251,008 B2 | 2/2016 | Anglin |
| 9,672,117 B1 | 6/2017 | Natanzon |
| 2003/0200480 A1 | 10/2003 | Beattie |
| 2007/0234106 A1 | 10/2007 | Lecrone |
| 2010/0057789 A1 | 3/2010 | Kawaguchi |
| 2012/0226937 A1 | 9/2012 | Akirav |
| 2015/0142739 A1 | 5/2015 | Mutalik |
| 2015/0186070 A1 | 7/2015 | Miller |

(Continued)

OTHER PUBLICATIONS

NPL: Google Scholar/Patents—text refined (Year: 2020).*
Google Patents/Scholar—text refined (Year: 2021).*
U.S. Appl. No. 15/586,329, Dec. 4, 2018, Office Action.

*Primary Examiner* — Christopher S McCarthy
(74) *Attorney, Agent, or Firm* — Workman Nydegger

(57) ABSTRACT

Example embodiments of the present invention relate to a method, a system, and a computer program product for performing data replication and backup. The method comprises performing a first data replication of a production site storage to a replication site storage and performing a first backup of the production site storage to a production site backup storage. A second data replication then may be performed from the production site backup storage to a backup site backup storage.

18 Claims, 15 Drawing Sheets

(56) References Cited

U.S. PATENT DOCUMENTS

| | | |
|---|---|---|
| 2016/0142485 A1 | 5/2016 | Mitkar |
| 2016/0162369 A1 | 6/2016 | Ahn |
| 2016/0216909 A1 | 7/2016 | Provenzano |
| 2016/0224429 A1 | 8/2016 | Prahlad |

* cited by examiner

FIG. 8 (NORMAL OPERATION)

FIG. 9 (FAILOVER OPERATION)

FIG. 10 (FAILOVER OPERATION – EMBODIMENT 1)

FIG. 11 (FAILOVER OPERATION – EMBODIMENT)

METHOD AND SYSTEM FOR STAR REPLICATION USING MULTIPLE REPLICATION TECHNOLOGIES

CROSS REFERENCE TO RELATED APPLICATION

This Application is a Continuation of U.S. patent application Ser. No. 15/586,329 entitled "METHOD AND SYSTEM FOR STAR REPLICATION USING MULTIPLE REPLICATION TECHNOLOGIES" filed May 4, 2017, now U.S. Pat. No. 10,430,290, which is a Continuation of U.S. patent application Ser. No. 14/584,240 entitled "METHOD AND SYSTEM FOR STAR REPLICATION USING MULTIPLE REPLICATION TECHNOLOGIES" filed Dec. 29, 2014, now U.S. Pat. No. 9,672,117, the entireties of which are hereby incorporated by reference.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to data backups, and more particularly to continuous data replication on deduplicated storage.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

Example embodiments of the present invention relate to a method, a system, and a computer program product for performing data replication and backup. The method comprises performing a first data replication of a production site storage to a replication site storage and performing a first backup of the production site storage to a production site backup storage. A second data replication then may be performed from the production site backup storage to a backup site backup storage.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
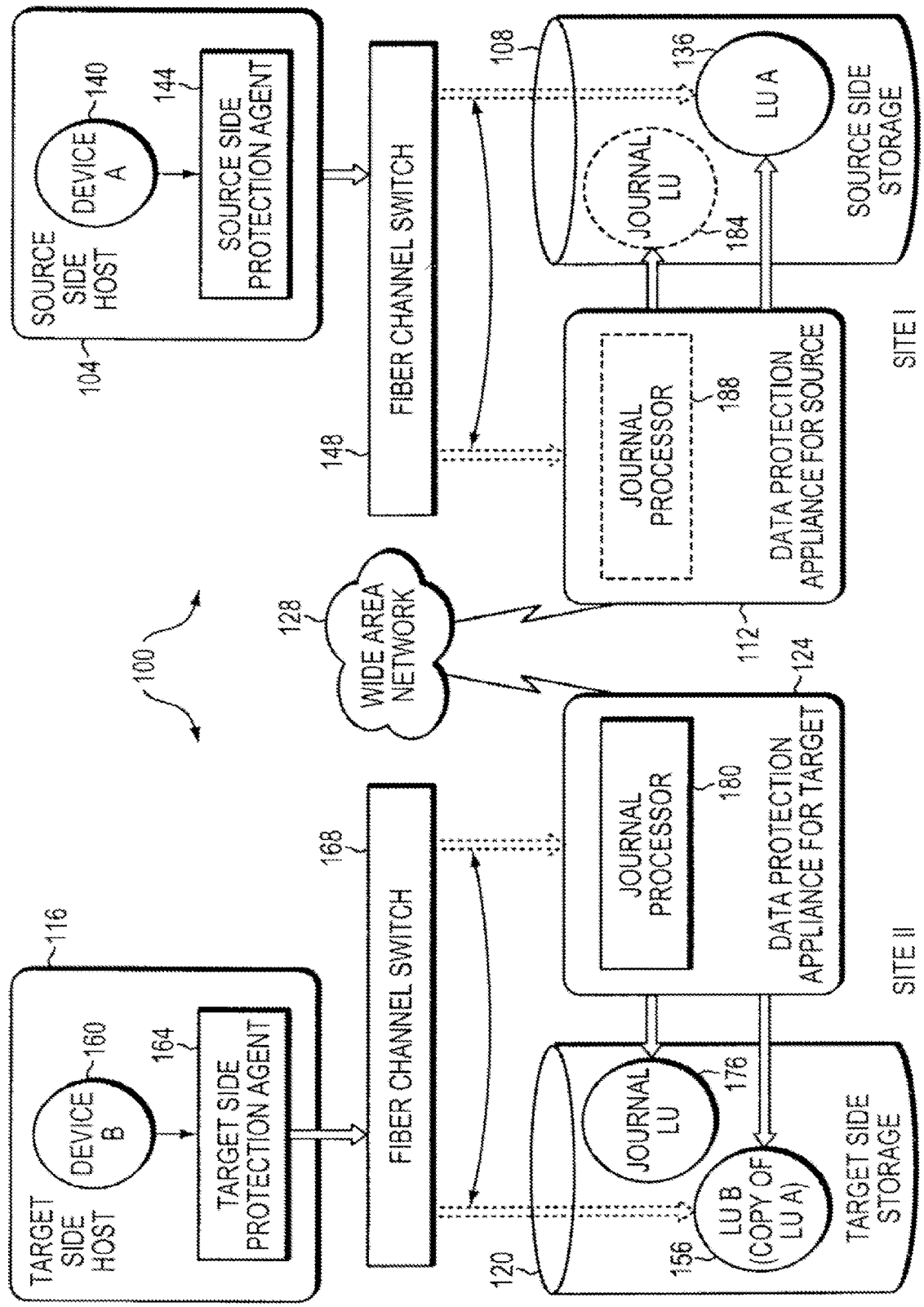
FIG. 1 is a block diagram of a data protection system according to an example embodiment of the present invention.

The following definitions are employed throughout the specification and claims.

BACKUP SITE—a facility where replicated production site data is stored; the backup site may be located in a remote site or at the same location as the production site;

BLOCK VIRTUALIZATION—may be a layer which take back end storage volumes and, by slicing, concatenating and striping, creates a new set of volumes that serve as base volumes or devices in the virtualization layer;

CLONE—a clone may be a copy or clone of the image or images, drive or drives of a first location at a second location;

CONTINUOUS DATA PROTECTION (CDP)—may refer to a full replica of a volume or a set of volumes along with a journal which allows any point in time access, the CDP copy is at the same site, and may be in the same storage array as the production volume;

CONTINUOUS REMOTE REPLICATION (CRR)—may refer to a full replica of a volume or a set of volumes along with a journal which allows any point in time access at a site remote to the production volume and on a separate storage array;

DATA PROTECTION APPLIANCE (DPA)—a computer or a cluster of computers (i.e., a physical device), or a set of processes (i.e., a virtual device or a combination of virtual and physical devices), that serve as a data protection appliance, responsible for data protection services including inter alia data replication of a storage system, and journaling of I/O requests issued by a host computer to the storage system;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DISTRIBUTED MIRROR—may be a mirror of a volume across a distance, either metro- or geo-, which is accessible at all sites;

FAIL ALL MODE—may be a mode of a volume in the splitter where all write and read I/Os intercepted by the splitter are failed to the host, but other SCSI command, like read capacity, are served;

GLOBAL FAIL ALL MODE—may be a mode of a volume in the virtual layer where all write and read I/Os to the virtual layer are failed to the host, but other SCSI commands, like read capacity, are served;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGGED ACCESS—may be an access method provided by the appliance and the splitter in which the appliance rolls the volumes of the consistency group to the point in time the user requested and let the host access the volumes in a copy on first write base;

LOGICAL UNIT—a logical entity provided by a storage system for accessing data from the storage system;

LUN—a logical unit number for identifying a logical unit or one or more virtual disks or virtual LUNs which may correspond to one or more virtual machines;

MANAGEMENT AND DEPLOYMENT TOOLS—provide the means to deploy, control, and manage DPAs through virtual environment management tools;

MARKING ON SPLITTER—may be a mode in a splitter where intercepted I/Os are not split to an appliance and the storage, but rather changes (meta data) are tracked in a list and/or a bitmap and I/Os are sent immediately down the I/O stack;

PHYSICAL STORAGE UNIT—a physical entity, such as a disk or an array of disks, for storing data in storage locations that can be accessed by address;

PRODUCTION SITE—a facility (i.e., physical or virtual) where one or more host computers run data processing applications that write data to a storage system and read data from the storage system;

REPLICATION PROTECTION APPLIANCE (RPA)—another name for DPA;

SAN—a storage area network of nodes that send and receive I/O and other requests, each node in the network being an initiator or a target, or both an initiator and a target;

SOURCE SIDE—a transmitter (i.e., physical or virtual) of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running (i.e., in both physical and virtual systems) either on a production host, a switch, or a storage array which can intercept IO and split them to a DPA and to the storage array, fail IO, redirect IO, or do any other manipulation to the IO; the splitter may be in the IO stack of a system and may be located in the hypervisor for virtual machines;

STORAGE MEDIUM—may refer to one or more storage mediums such as a hard drive, a combination of hard drives, flash storage, combinations of flash storage, combinations of hard drives, flash, and other storage devices, and other types and combinations of computer readable storage mediums including those yet to be conceived; a storage medium may also refer both physical and logical storage mediums and may include multiple level of virtual to physical mappings and may be or include an image or disk image;

STORAGE SYSTEM—a SAN entity that provides multiple logical units for access by multiple SAN initiators;

TARGET—a node in a SAN that replies to I/O requests;

TARGET SIDE—a receiver (i.e., physical or virtual) of data within a data replication workflow; during normal operation a back site is the target side, and during data recovery a production site is the target side;

VASA—vSphere storage Application programming interfaces (APIs) for storage Awareness;

VIRTUAL ACCESS—may be an access method provided by the appliance and the splitter in which the appliance exposes a virtual volume from a specific point in time to the host, the data for the virtual volume is partially stored on the remote copy and partially stored on the journal;

VIRTUAL VOLUME—may be a volume which is exposed to a host by a virtualization layer and may span across more than one site;

VMDK—a virtual machine disk file containing disk data in a VMFS (analog to a LUN in a block storage array);

VMFS—a virtual machine file system provide by VMware, Inc. for storing a virtual machine; and WAN—a wide area network that connects local networks and enables them to communicate with one another, such as the Internet.

Description of Embodiments Using a Five State Journaling Process

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier point in time, which may be used in the event of data corruption of a disaster, or alternatively in order to view or to access data from an earlier point in time.

During normal operations, the direction of replicated data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
Redirect the SCSI command to another logical unit;
Split the SCSI command by sending it first to the respective DPA. After the DPA returns an acknowledgement, send the SCSI command to its intended logical unit;
Fail a SCSI command by returning an error return code; and
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system. Additionally or alternatively, the protection agent may be installed as part of the storage array IO stack. In some embodiments the DPA may be installed as a virtual appliance or as a set of processes inside the storage array.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
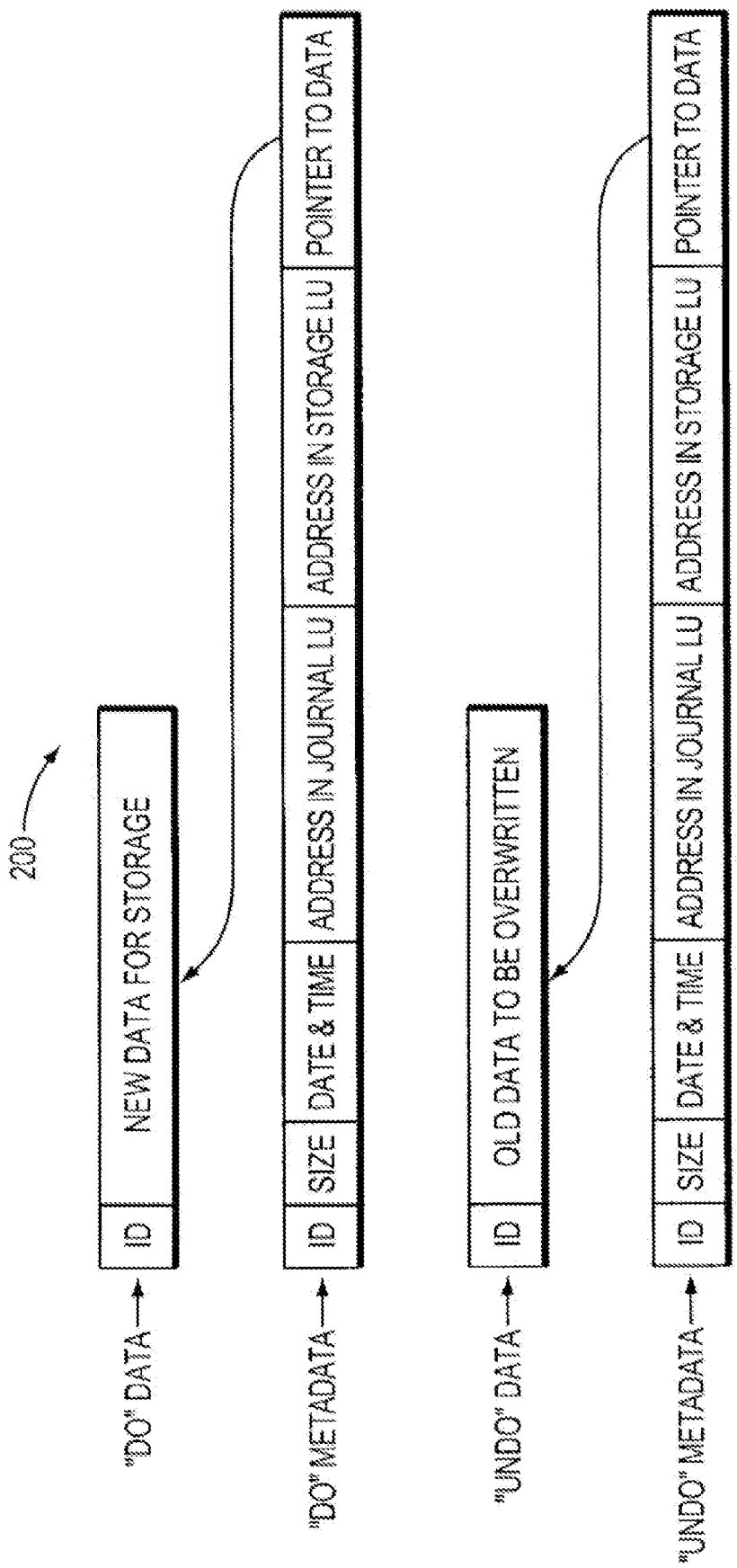
FIG. 2 is a simplified illustration of a write transaction for a journal according to an example embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
 one or more identifiers;
 a time stamp, which is the date & time at which the transaction was received by source side DPA 112;
 a write size, which is the size of the data block;
 a location in journal LU 176 where the data is entered;
 a location in LU B where the data is to be written; and
 the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication set may refer to an association created between the source volume and the local and/or remote target volumes, and a consistency group contains one or more replication sets. A snapshot may be the difference between one consistent image of stored data and the next. The exact time for closing the snapshot may be determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC® PowerPath™), through an intelligent fabric switch, through array-based splitter, such as EMC CLARiiON®.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805 entitled "PROTECTION OF MIRRORED DATA" issued on Mar. 18, 2008, a discussion of journaling and some techniques associated with journaling may be found in U.S. Pat. No. 7,516,287 entitled "METHODS AND APPARATUS FOR OPTIMAL JOURNALING FOR CONTINUOUS DATA REPLICATION" issued on Apr. 7, 2009, and a discussion of dynamically adding storage for a journal may be found in U.S. Pat. No. 7,840,536 entitled "METHODS AND APPARATUS FOR DYNAMIC JOURNAL EXPANSION" issued on Nov. 23, 2010, all of which are assigned to EMC Corporation of Hopkinton, Mass. and are hereby incorporated by reference in their entirety.

Initializing a Backup Snapshot on Deduplicated Storage

Figure 3:
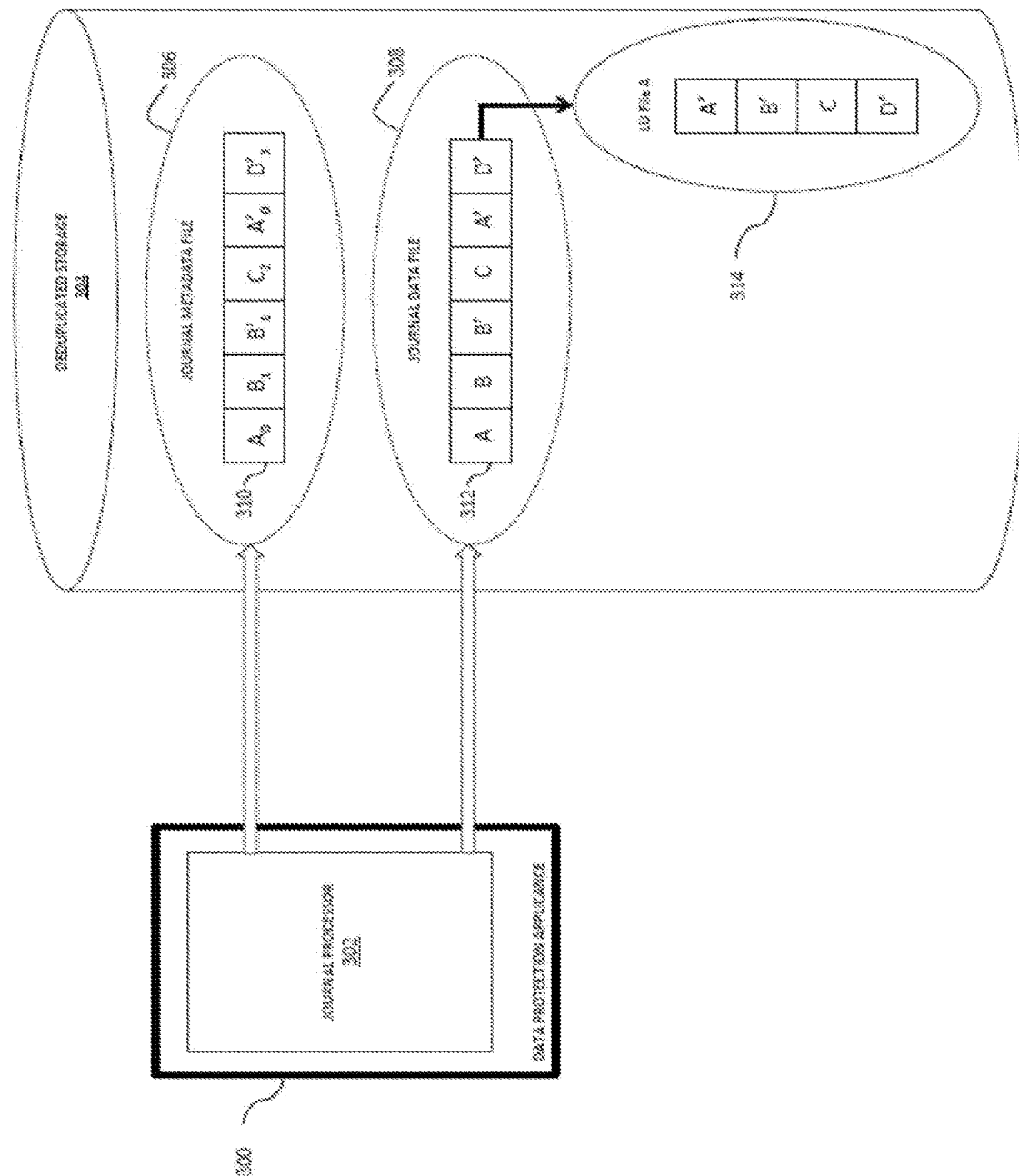
FIG. 3 is a block diagram of a system for initializing a backup snapshot according to an example embodiment of the present invention.
Figure 4:
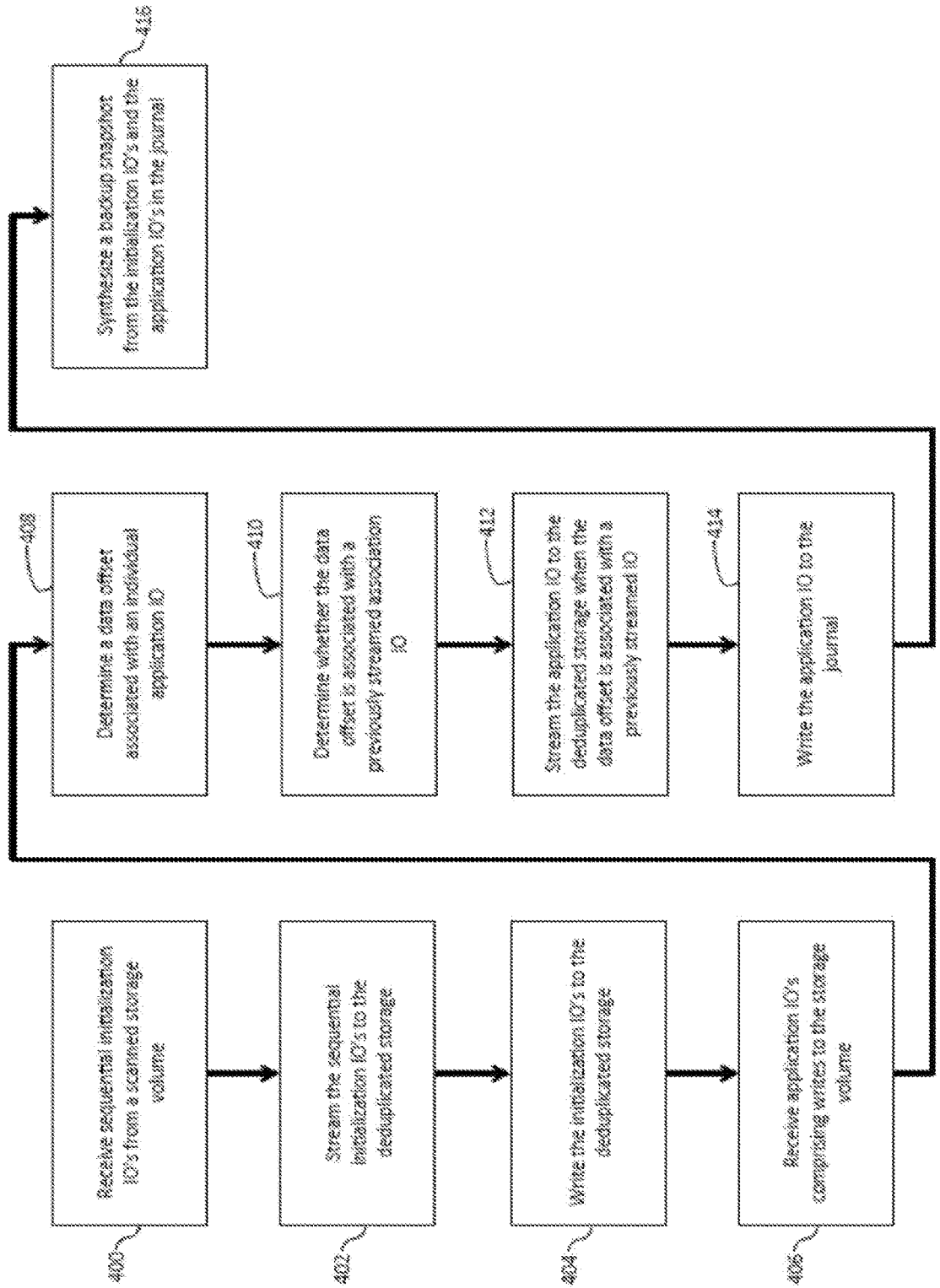
FIG. 4 is a flow chart illustrating a method for initializing a backup snapshot according to an example embodiment of the present invention.
Figure 5:
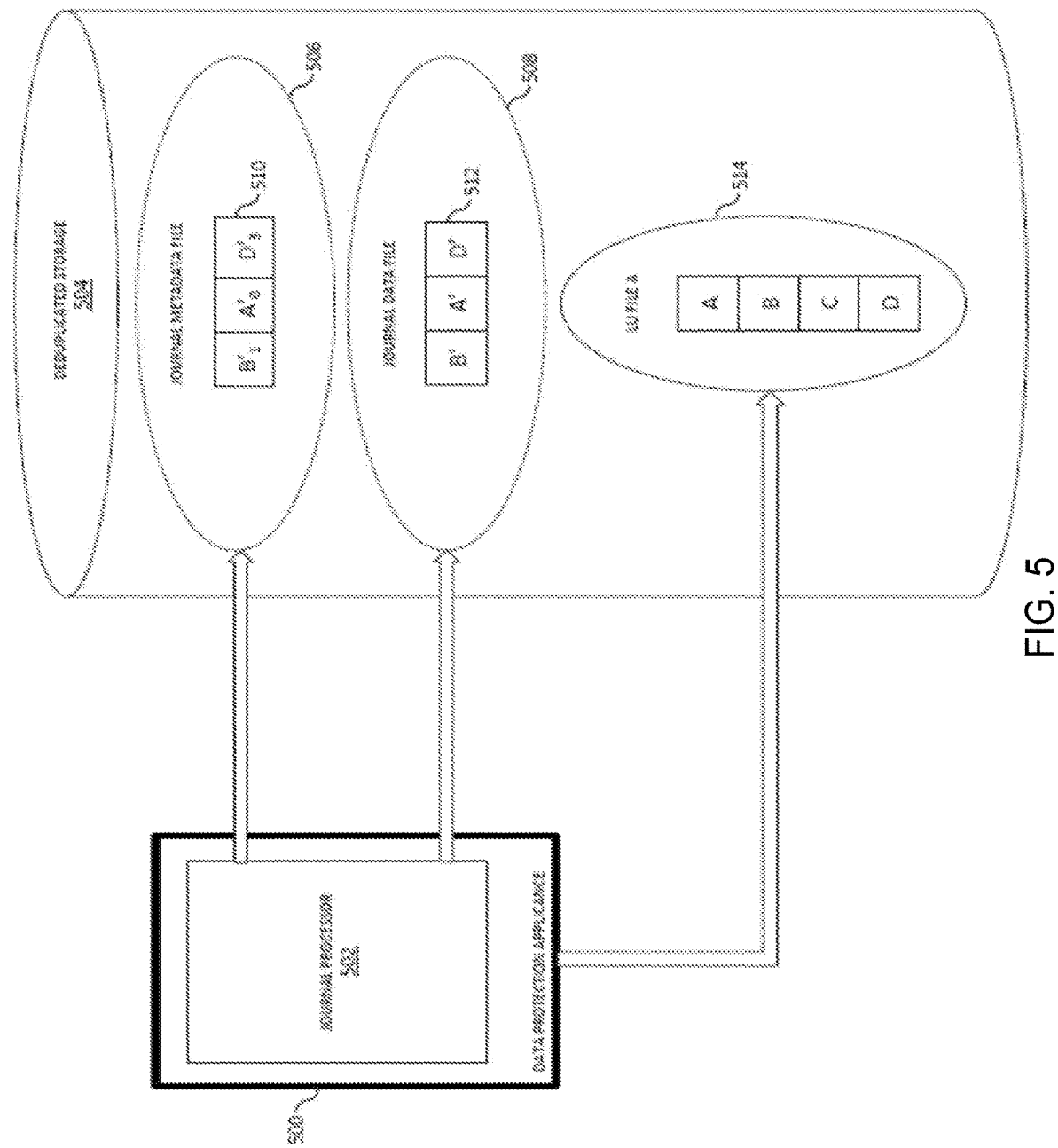
FIG. 5 is a block diagram of a system for initializing a backup snapshot according to an example embodiment of the present invention.

FIGS. 3-5 depict systems and processes for initializing a backup snapshot on deduplicated storage according to an example embodiment of the present invention. Before deduplicated storage can provide continuous backup protection, it may be necessary to create an initial backup snapshot of the source storage system. This initial backup snapshot may represent the earliest point-in-time backup that may be restored. As changes are made to the source storage system, journal files and/or new backups may be updated and/or synthesized to provide continuous protection. In some embodiments, the initial backup snapshot may be created by streaming I/Os from a storage system scan to a data protection appliance, or by taking an initial snapshot of the storage system and transmitting the entire snapshot to deduplicated storage.

FIG. 3 is a block diagram of a system for initializing a backup snapshot according to an example embodiment of the present invention. As illustrated in FIG. 3, the system for creating an initial backup snapshot may scan a source storage system and stream I/Os to the deduplicated storage. A data protection appliance 300 may comprise a journal processor 302, and may be in communication with deduplicated storage 304. In an example embodiment of the present invention, deduplicated storage 304 may be target side storage residing at a backup site. The data protection appliance 300 may be similar to either or both of the data protection appliances 112, 124 as illustrated in FIG. 1 and may be responsible for streaming I/Os to deduplicated storage 304.

In an embodiment, a source storage system may be scanned and individual offsets may be streamed to the data protection appliance 300. The offsets streamed from the scanned system may be referred to as initialization I/Os, and may be streamed sequentially to the data protection appliance 300. For example, the scanned system may comprise offsets 0, 1, 2, and 3, comprising data A, B, C, and D. The initial scan may start at the beginning of the system, and transmit offset 0, followed by offset 1, et seq. As the data protection appliance 300 receives the initialization I/Os, the journal processor 302 may identify the offset data and metadata, and may stream the I/Os to a metadata journal 306 and/or a data journal 308 residing on the deduplicated storage 304. The data journal 308 may comprise data stored within an offset, and metadata 306 may include metadata associated with that offset. Metadata may include, for example, an offset identifier, size, write time, and device ID. These journals then may be used to synthesize a backup snapshot on the deduplicated storage 304, as described below.

In some embodiments, a scanned storage system may operate in a live environment. As a result, applications may be writing to the storage concurrently with the scan process. Accordingly, if an application writes to a location that has already been streamed, the journal files and, ultimately, the synthesized snapshot may be out of date (i.e., not coherent). To address this issue, application I/Os may be streamed concurrently with the initialization I/Os if the application I/Os are to an offset that has already been scanned.

TABLE 1

| Offset | Time | | | |
| --- | --- | --- | --- | --- |
| | $t_0$ | $t_1$ | $t_2$ | $t_3$ |
| 0 | A | | | A' |
| 1 | B | B' | | |
| 2 | C | | | |
| 3 | D | | D' | |

Table 1 depicts four different offsets, denoted as 0, 1, 2, and 3, and four times, t0, t1, t2, and t3. Letters A, B, C, and D may represent the data stored at the offsets. Time $t_0$ may represent the offsets as they exist when the scan begins. These offsets may be streamed to the data protection appliance 300 sequentially from 0 to 3. At time $t_1$, however, the data at offset 1 is modified by an application from B to B'. Similarly, at time $t_2$, the data at offset 3 changes from D to D', and at time $t_3$ the data at offset 0 changes from A to A'. If the scan transmits the data at offset 1 before time $t_1$, B' may be missed because the change occurred after offset 1 was scanned and B was transmitted. Similarly, if the scan has not reached offset 3 before time $t_2$, only D' will be transmitted because D no longer exists. It may, therefore, be beneficial to transmit application I/Os to the data protection appliance 300 if those I/Os write to an offset that has already been scanned. If the offset has not been scanned, it may not be necessary to transmit the application I/Os because the change will be transmitted when the scan reaches that offset.

Offset metadata journal entries 310 and offset data journal entries 312 depict the state of metadata journal 306 and the data journal 308 after the initial scan is complete. As illustrated in the example embodiment of FIG. 3, while there are only four offsets on the scanned storage system, there are six entries in the journal because the data in offsets 0 and 1 was modified by an application after they were scanned. They each, therefore, have two entries: B and B'. Segment D was modified after the scan began, but before it was reached. Therefore, segment D has only one entry: D'.

The metadata journal entries 310 and the data journal entries 312 may include all of the data necessary to synthesize a backup snapshot of the scanned storage system. The data journal entries 312 may contain the actual data from the storage system: A, B, B' C, A', and D'. Note that data D is not in the data journal 308 because it was modified on the storage system before its offset was scanned and transmitted. The metadata journal entries 310 may include metadata about the offsets. For example, the metadata journal entries 310 may include an offset identifier, offset length, and write time, and volume/device ID. In the present example, the metadata journal entries may include the following entries.

TABLE 2

| Entry | Volume | Offset | Size | Time |
|---|---|---|---|---|
| 0 | A | 0 kb | 8 kb | $t_0$ |
| 1 | A | 8 kb | 8 kb | $t_0$ |
| 2 | A | 8 kb | 8 kb | $t_1$ |
| 3 | A | 16 kb | 8 kb | $t_0$ |
| 4 | A | 0 kb | 8 kb | $t_3$ |
| 5 | A | 24 kb | 8 kb | $t_2$ |

Table 2's metadata entries may correspond to the states shown in Table 1. The offset at location 0 may be offset 0, the offset at 8 kb may be offset 1, the offset at 16 kb may be offset 2, and the offset at 24 kb may be offset 3. The subscript of each journal entries 310 also identifies the offset associated with that metadata entry.

Deduplicated storage may use the metadata journal 306 and the data journal 308 to synthesize initial backup snapshot 314. First, the metadata journal 306 may be queried to identify the most recent data associated with each offset. Next, the data may be retrieved from the journal data file 308 and synthesized into a backup snapshot 314. In some embodiments, synthesizing the backup snapshot may comprise creating and/or copying pointers rather than copying entire data blocks. This could be, for example, using a product such as EMC® DataDomain® Boost™

For example, once the initial scan is complete, the data journal 308 includes data A, B, B', C, A', and D'. A' and B' are the result of application I/Os occurring during the scan process, and therefore represent the present state of offsets 0 and 1. To create the backup snapshot 314, deduplicated storage may therefore retrieve A', B', C, and D' from the data journal 308 and synthesize them together.

Once the initial backup snapshot 314 is synthesized, journal entries 310 and 312 may no longer be needed. In an embodiment, they may be removed from the deduplicated storage 304 in order to conserve space. Alternatively, they may remain in the journals.

FIG. 4 is a flow chart illustrating a method for initializing a backup snapshot according to an example embodiment of the present invention. Sequential initialization I/Os are received from a scanned storage volume (400). These I/Os may be, for example, received at a data protection appliance, such as the data protection appliance 300. In some embodiments, the initialization I/Os are read from the scanned storage volume by the data protection appliance.

The initialization I/Os are then streamed to a deduplicated storage (402). In an example embodiment, the deduplicated storage may be substantially similar to the deduplicated storage 304 illustrated in FIG. 3. In some embodiments, the initialization I/Os are streamed to a data journal using a data stream, and to a metadata journal using a metadata stream. Each stream may be a file in the deduplicated storage. Additionally or alternatively, writes to the journal files may be done though the DDBoost API or any other API.

The initialization I/Os then may be written to a journal on the deduplicated storage (404). This journal may be, for example, similar to the metadata journal 306 and/or the data journal 308 of FIG. 3. In an example embodiment, these journals may be in the same journal files. Alternatively, these journals may be separate files on the deduplicated storage system.

Application I/Os comprising writes to offsets on the scanned storage volume may be received (406). These application I/Os may also be received at a data protection appliance, such as data protection appliance 300 of FIG. 3.

An offset associated with a specific application IO is identified (408) and it is determined whether the offset has already been streamed to the deduplicated storage (410). This determination may be made on the data protection appliance 300 using the journal processor 302. If the offset has already been streamed, it must have already been scanned and included in an initialization IO. If the offset has not been streamed, the storage volume scan may not have reached the offset on the storage volume.

The application IO is streamed to the deduplicated storage if its offset was included in a previously streamed initialization IO (412). In an example embodiment, the application IO is only streamed when its offset was included a previously streamed initialization IO. Streaming the application IO when its offset was included in a previous initialization IO ensures that writes to the scanned volume are not missed during the initialization processes. In some embodiments, the application I/Os are streamed to a data journal using a data stream, and to a metadata journal using a metadata stream.

In an example embodiment, application I/Os are not streamed if they comprise writes to an offset that has not yet been scanned and streamed in an initialization IO. This is because the data created by the write will be included in the initialization IO once the scan reaches that offset. This may reduce traffic between the data protection appliance and the deduplicated storage, and may reduce the workload on the deduplicated because the data will only be processed once.

The application IO then may be written to the journal (414). This journal may be the same journal as the initialization I/Os or it may be a separate journal. In an example embodiment, the journal may be the data journal 308 and/or the metadata journal 306.

Finally, a backup snapshot may be synthesized from the initialization I/Os and the application I/Os (416). This snapshot may be substantially similar to the snapshot 314 of FIG. 3. In an example embodiment, the snapshot is synthesized by creating data pointers in a new file on the deduplicated storage. Additionally or alternatively, the pointers may be copied from the data journal. These pointers may point to the data referenced and/or contained in the journal. Synthesizing the snapshot using pointers may improve performance, as the data may not need to be replicated.

FIG. 5 is a block diagram of a system for initializing a backup snapshot according to an example embodiment of the present invention. FIG. 5 depicts an additional or alternative embodiment for initializing a backup snapshot. The system shown in FIG. 5 may include a data protection appliance 500, a journal processor 502, and a deduplicated storage 504. These elements may be substantially similar to those discussed in reference to FIG. 3.

The data protection appliance 500 may take a snapshot of a storage system and transmit that snapshot to the deduplicated storage 504 for storage as a file. In an example embodiment, this is different than streaming initialization I/Os and synthesizing a snapshot from journal files. Rather than creating the snapshot on the deduplicated storage, the backup snapshot is created using the data protection appliance 500 and transmitted to the deduplicated storage 504 to be stored as a backup snapshot 514.

In an example embodiment, the journal processor 502 may stream application I/Os to the deduplicated storage, and those application I/Os may be stored in a metadata journal 506 and a data journal 508. Like the journals of FIG. 3, the metadata journal 506 may include metadata journal entries 510, and the data journal 508 may include data journal entries 512. These journals 506, 508 may be used to synthesize a second backup snapshot or enable point-in-time recovery, as discussed below.

The systems and processes discussed with reference to FIGS. 3-5 enable a system to create an initial backup snapshot. Once the initial snapshot is created, additional processes may enable continuous data protection and point-in-time recovery. These processes will now be discussed.

Maintaining Backup Snapshots with Continuous Data Replication

Figure 6:
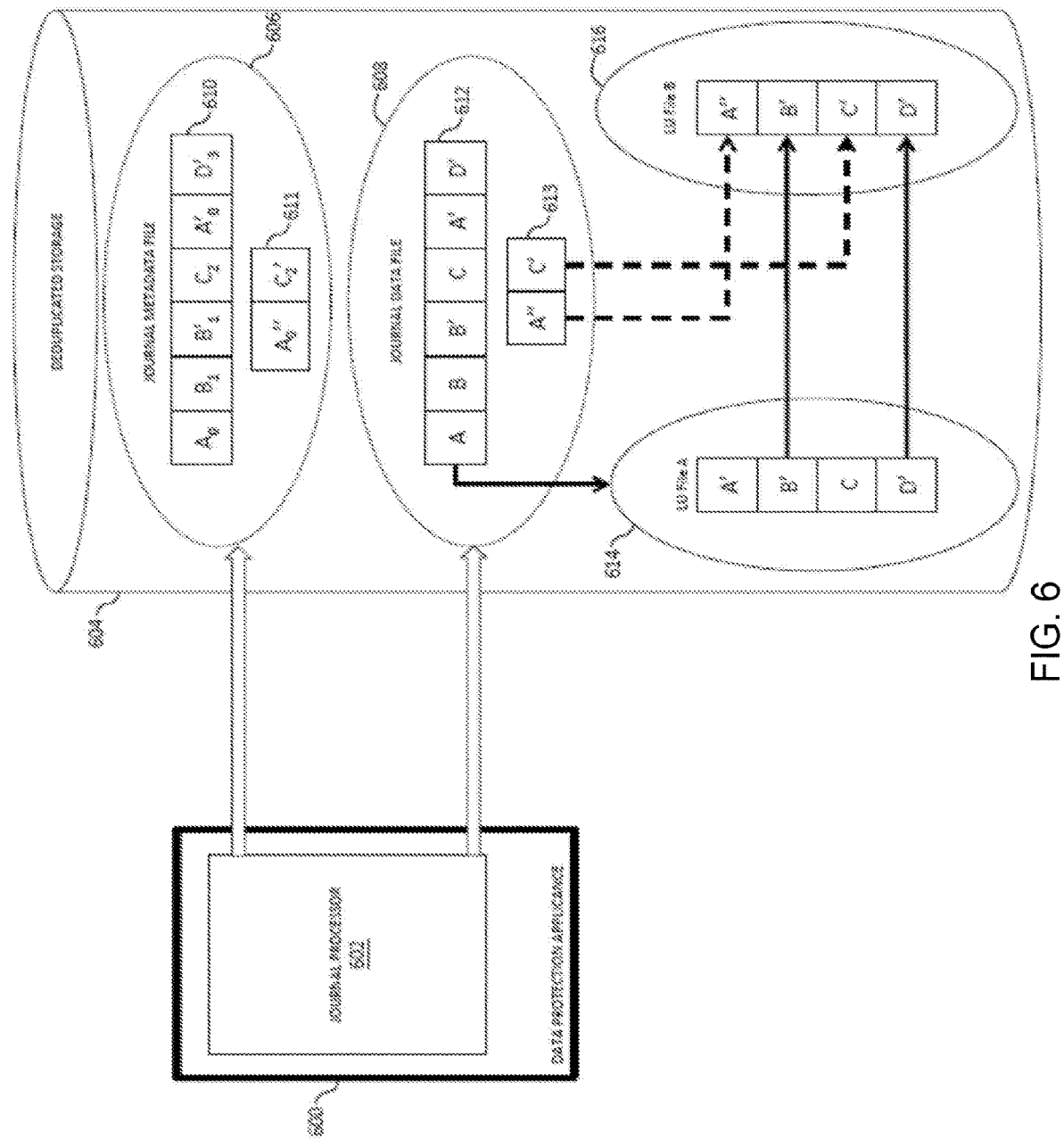
FIG. 6 is a block diagram of a system for synthesizing new backup snapshots according to an example embodiment of the present invention.

FIG. 6 is a block diagram of a system for synthesizing new backup snapshots according to an example embodiment of the present invention. As datasets increase in size, backing them up to remote or local backup devices becomes increasingly costly and complex. Additionally, traditional backup processes may not allow point-in-time recovery since the backups occur on a periodic, rather than continuous, basis. The methods and systems discussed herein provide continuous backup protection as writes are made to a source device, thereby reducing backup cost and complexity, and may allowing point-in-time recovery for backed up files.

The system of FIG. 6 includes a data protection appliance 600, a journal processor 602, and a deduplicated storage 604. These elements may be substantially similar to those discussed in reference to FIG. 3. The deduplicated storage 604 may include a backup snapshot 614, a metadata journal file 606, and a data journal file 608. In an example embodiment, a backup snapshot file 614 is synthesized in a manner substantially similar to the backup snapshot 314 of FIG. 3, and may be created using metadata journal entries 610 and data journal entries 612.

As users, applications, and other processes access and use the source storage system, data on that system may change and/or new data may be created. As a result, the initial backup snapshot 614 may become stale. If the source storage system should fail, there is a chance that any new or modified data may be lost. To address this concern, the data protection appliance 600 may receive and stream application I/Os to the deduplicated storage system 604 on a continuous basis, even after the initial backup snapshot 614 is synthesized. Streaming the application I/Os allows the backups on the deduplicated storage 604 to remain up-to-date, without needing to perform additional backups of large datasets. This may reduce network traffic, reduce workloads, and conserve space on the deduplicated storage 604.

For example, new metadata entries 611 and new data journal entries 613 represent I/Os made after the initial backup snapshot 614 was synthesized. These entries may be written to the metadata journal 606 and the data journal 608, as shown in FIG. 6, or they may be written to separate journal files. In FIG. 6, data A' and C were modified on the source storage device, and the journal entries therefore comprise A" and C'.

Periodically, new backup snapshots may be synthesized from a previous backup snapshot and new journal entries. For example, a second backup snapshot 616 may be synthesized from the initial backup snapshot 614, new metadata journal entries 611, and new data journal entries 613. The second backup snapshot 616 may be used to restore the source storage system up to the point-in-time the last journal entry was received. In other words, the backup snapshot 616 represents a backup of the source storage system at a later timestamp than the initial backup snapshot 614.

In an embodiment, synthesizing the second backup journal entry 616 may be substantially similar to synthesizing the initial backup snapshot 614. Rather than synthesizing all of the data from the data journal 608, however, unchanged data may be synthesized from the initial backup snapshot 614. In an example embodiment, this synthesis may comprise copying and/or creating a data pointer. For example, in FIG. 6 the solid arrows between the initial backup snapshot 614 and the second backup snapshot 616 represent unchanged data that is common between the two snapshots 614, 616. In this case, only B' and D' remain unchanged. The dashed arrows represent new or changed data that needs to be synthesized into the second backup snapshot 616. In FIG. 6, A' is changed to A", C is change to C'. Synthesizing the data into the second backup snapshot 616 therefore results in A", B', C', D'.

Additionally or alternatively, the second backup snapshot 616 may be synthesized entirely from journal entries. Rather than synthesizing unchanged data from the initial backup 614, the deduplicated storage 604 may retrieve the unchanged data from the data journal entries 612. For example, B' and D' may be synthesized from the data journal entries 612 rather than from the initial backup snapshot 614.

Additional backup snapshots, such as the second backup snapshot 616, may be created periodically or on demand. For example, a user policy may specify that new snapshots should be created every week. Additionally or alternatively, a user may be preparing to perform some risky operations on the source storage system, and may demand that a snapshot be created in case something goes wrong. These policies may be maintained and applied using the data protection appliance 600, the deduplicated storage 604, and/or an external system.

Figure 7:
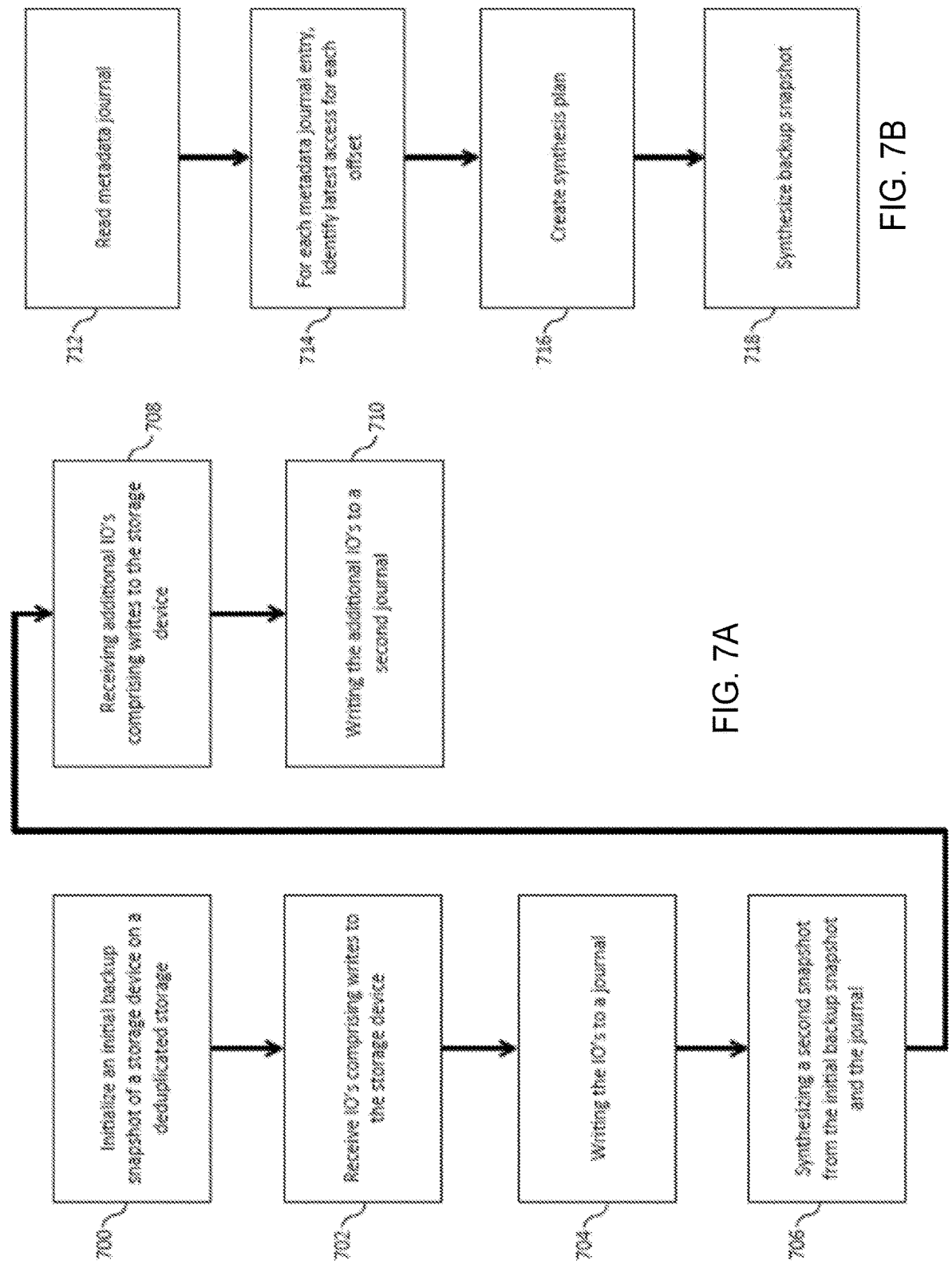
FIG. 7A is a flow chart illustrating a method for maintaining backup snapshots using continuous data replication according to an example embodiment of the present invention.
FIG. 7B is a flowchart illustrating a method for creating a synthesis plan according to an example embodiment of the present invention.

FIG. 7A is a flow chart illustrating a method for maintaining backup snapshots using continuous data replication according to an example embodiment of the present invention. An initial snapshot of a source storage system may be created (700). This initial snapshot may be substantially similar to the initial backup snapshot 614 of FIG. 6, and may be created using the processes discussed in reference to FIGS. 3-5. Additionally or alternatively, the initial snapshot may be any previously created snapshot. For example, the initial snapshot may be similar to the second backup snapshot 616, and may be used in conjunction with journal files to create a third backup snapshot.

Application I/Os comprising writes to the source storage system may be received (702). These writes may update existing data or create new data. In an embodiment, the application I/Os may be received by a data protection appliance, such as the data protection appliance 600 of FIG. 6.

The application I/Os may be written to a journal file (704). This journal file may be substantially similar to metadata journal file 606 and/or data journal file 608 of FIG. 6. In an embodiment, the application I/Os may be written to one or more existing journals. Alternatively, application I/Os arriving after a snapshot is synthesized may be written to their own unique journals. This may be beneficial, for example, when maintaining different levels of backup granularity, as discussed below. In some embodiments, the application I/Os are sequentially written to the journal as they are received. For example, if application I/Os arrive in order B, C, A, their corresponding entries in the journal will also be B, C, A.

A second snapshot may be synthesized from the initial backup snapshot and the journal (706). The second snapshot may be substantially similar to second backup snapshot 616 of FIG. 6, and the synthesis process may be similar to that depicted by the solid and dashed lines. In some embodiments, the second snapshot may be synthesized entirely from journal files rather than use the initial backup snapshot. During and/or after the synthesis process, additional application I/Os may be received (708). These application I/Os could be used, for example, to create the third backup snapshot in the future, and may be processed in a manner similar to all the other application I/Os discussed herein.

Finally, the additional application I/Os may be written to a journal file (710). They may be written to the same journal as the previous I/Os, or they may be written to a new journal file.

FIG. 7B is a flowchart illustrating a method for creating a synthesis plan according to an example embodiment of the present invention. A metadata journal may be read (712). This metadata journal may be, for example, the metadata journal file 606 of FIG. 6. In an embodiment, the metadata journal may be read using a journal processor 602 on a data protection appliance 600 of FIG. 6. Additionally or alternatively, the read operation may be local to the deduplicated storage device.

The latest I/Os for each offset may be identified (714). For example, metadata journal file 606 comprises journal entries 610 and 611. The latest entry for offset 0 is A", 1 is B', 2 is C', and 3 is D'. In some embodiments, the journal entries 610 and 611 may be written to different journals. In such an embodiment, the only I/Os identified would be A" and C' since we are synthesizing a snapshot from initial backup snapshot 614.

A synthesis plan then may be created (716). This plan may identify where each I/O should be synthesized from. For example, the synthesis plan may only identify A" and C' for synthesis from data journal 608. The B' and D', in contrast, may be obtained from initial backup snapshot 614 since they have not changed.

Finally, the backup snapshot may be synthesized (718). This backup snapshot may be, for example, substantially similar to backup snapshot 616 of FIG. 6.

The system and processes discussed herein may enable additional backup snapshots to be synthesized from journal entries and existing snapshots. In some embodiments, the journal entries may be application I/Os which are continuously streamed to a data protection appliance. While these snapshots may provide additional data protection, they may only allow data that exists in the snapshots to be recovered. Combining snapshots and journal files may, however, allow any point-in-time recovery.

Star Replication Using Multiple Replication Technologies

Figure 8:
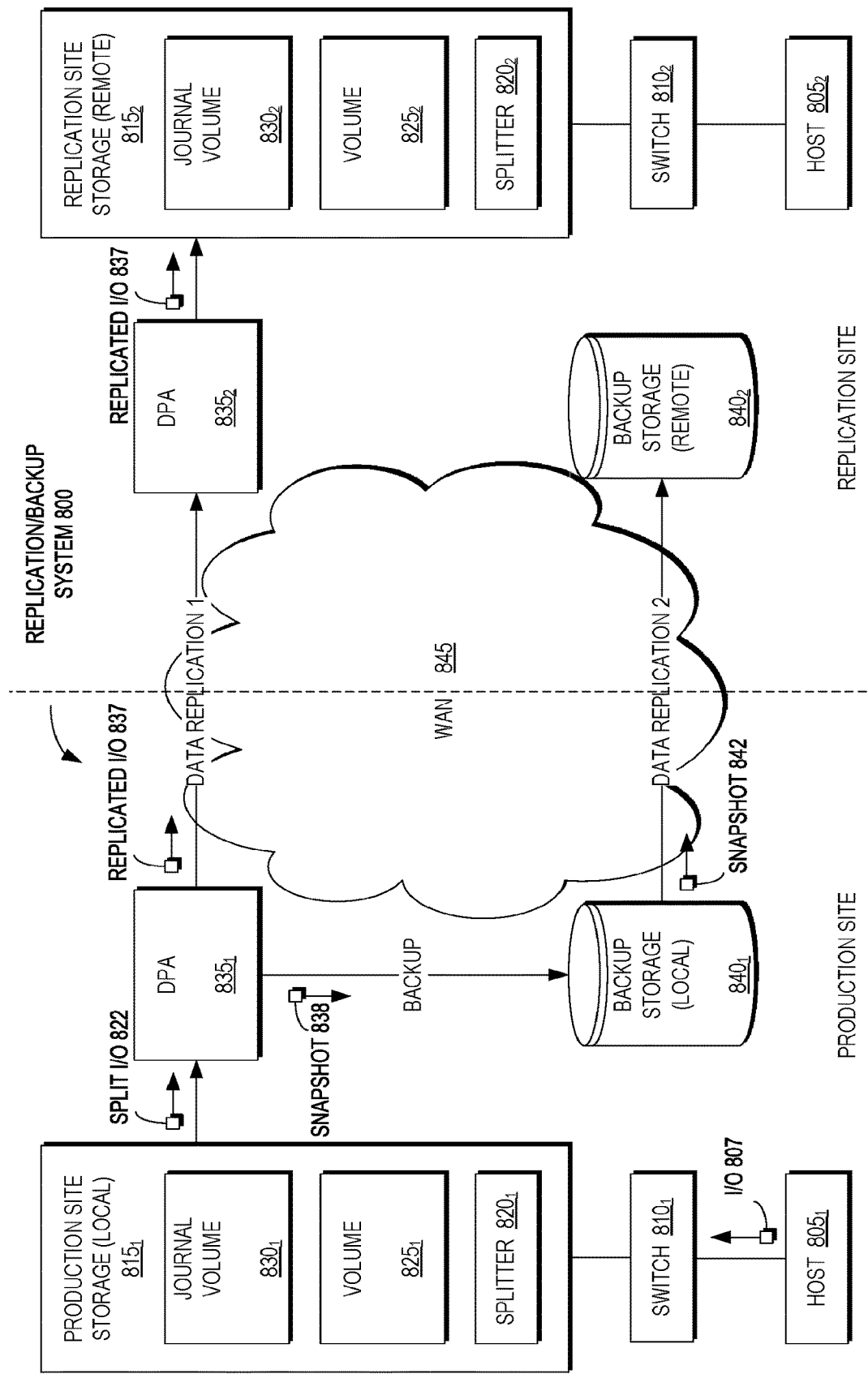
FIG. 8 is a block diagram of a system for performing a first data replication and a second data replication according to an example embodiment of the present invention.

FIG. 8 is a block diagram of a system 800 for performing a first data replication and a second data replication according to an example embodiment of the present invention. As illustrated in FIG. 8, the system 800 includes a production site having a host $805_1$, a switch $810_1$, production site storage $815_1$, a data protection appliance (DPA) $835_1$, and production site backup storage $840_1$. The system 800 also includes a replication site having a host $805_2$, a switch $810_2$, replication site storage $815_2$, a data protection appliance (DPA) $835_2$, and replication site backup storage $840_2$. In certain embodiments, the replication site backup storage $840_2$ may be in a third backup site. Therefore, example embodiments discussed below refer to a backup site backup storage $840_2$ that may be at the replication site or a third backup site. It should be understood that the production site storage $815_1$ and the replication site storage $815_2$ may be storage arrays, such as VNX® or VMAX® storage arrays by EMC Corporation of Hopkinton, Mass. Similarly, it should be understood that the production site backup storage $840_1$ and the backup site backup storage $840_2$ may be Data Domain® backup storage systems by EMC Corporation of Hopkinton, Mass.

As illustrated in FIG. 8, and as described above with reference to FIGS. 1 and 2, the production site host $805_1$ may send an I/O 807 via the switch $810_1$ to the production site storage $815_1$. A splitter $820_1$ in, for example, the production site storage $815_1$ may intercept the I/O 807 and split the I/O 807 to both a production site volume $825_1$ and the production site DPA $835_1$ as a split I/O 822. The production site DPA $835_1$ then may replicate the split I/O 822 as a replicated I/O 837 via a first data replication to the replication site. The replication site DPA $835_2$ then may process the replicated I/O 837 to the replication site storage $815_2$ to be stored in a volume $825_2$.

As illustrated in FIG. 8, however, the production site DPA $835_1$ also may back up the production site storage $815_1$ to the production site backup storage $840_1$. The production site DPA $835_1$ may periodically send a snapshot 838 or do continuous backup as described in FIGS. 3-7 to a file in the production site backup storage $840_1$. In certain embodiments, the production site storage $815_1$ may create a snapshot and the production site DPA $835_1$ may determine differences between this snapshot and the latest snapshot shipped to the production site backup storage $840_1$; these differences then may be read from the production site storage $815_1$ and sent to the backup site backup storage $840_1$. The production site backup storage $840_1$ may retain a number of backup snapshots for certain periods of time, with each snapshot of the volume stored as a file in the backup device. The production site backup storage $840_1$ then may periodically create a snapshot of the backup files as a new version of the data and ship that new version via a second data replication to the backup site backup storage $840_2$. In other embodiments the data may be copied continuously to the backup device as described in FIGS. 3-7.

Figure 12:
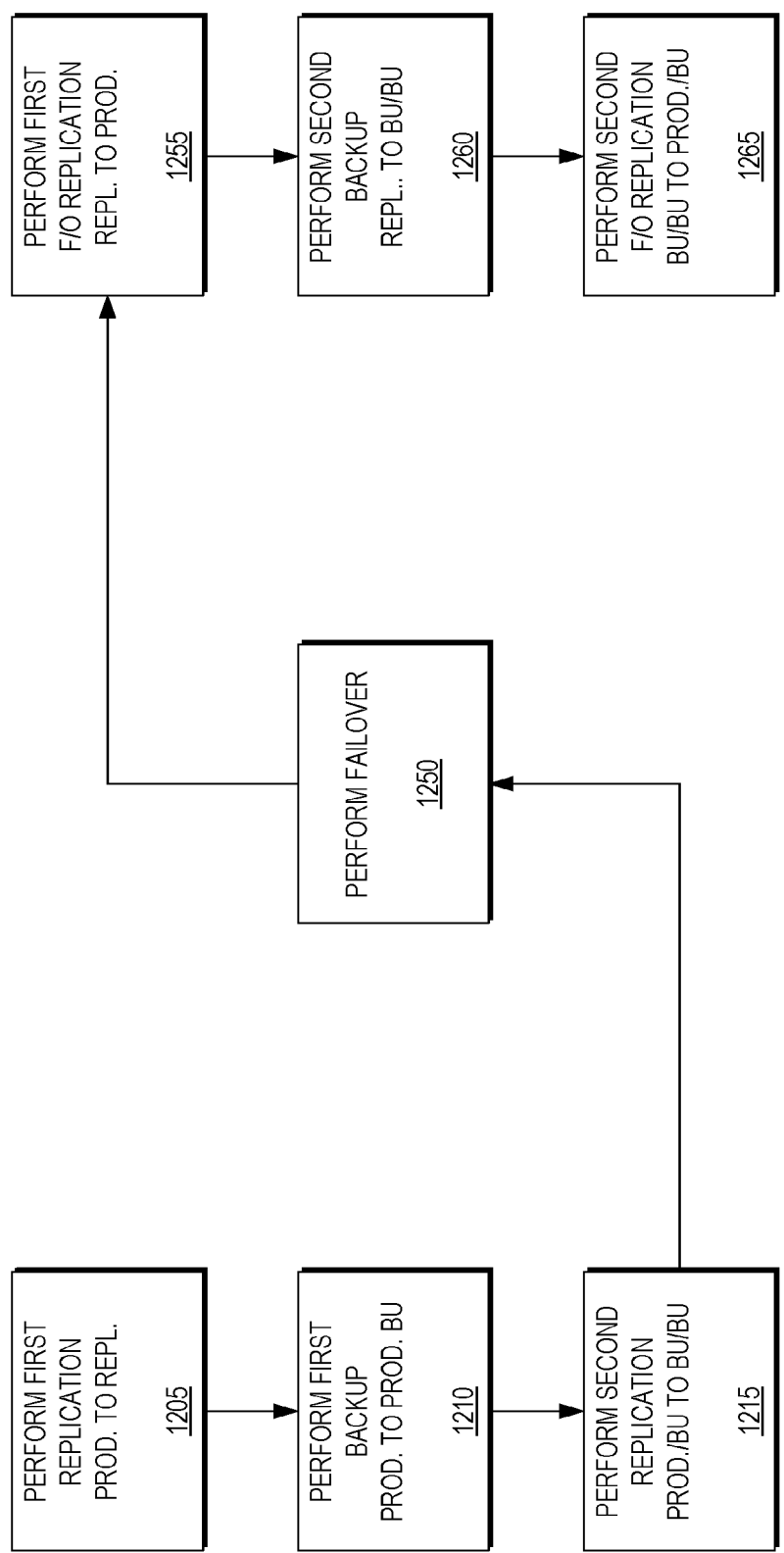
FIG. 12 is a flow diagram illustrating a method for performing data replication, performing a failover, and performing a failover data replication for performing a first data replication and a second data replication in the system of FIG. 8 according to an example embodiment of the present invention.

It should be understood that the system 800 of FIG. 8 employs two parallel data replications: a first continuous data replication between the production site DPA $835_1$ and the replication site DPA $835_2$, and a second asynchronous data replication between the production site backup storage $840_1$ and the backup site backup storage $840_2$. Further, it should be understood that the system 800 of FIG. 8 employs two use cases: the two independent data replications and the data backup between the production site storage $815_1$ and the production site backup storage $840_1$. Therefore, as illustrated in FIG. 12, which is a flow diagram illustrating a method for performing data replication, performing a failover, and performing a failover, the system 800 may perform a first data replication from the production site storage $815_1$ to the replication site storage $815_2$ (1205), a first backup from the production site storage $815_1$ to the production site backup storage $840_1$ (1210), and a second replication from the production site backup storage $840_1$ to the backup site backup storage $840_2$ (1215). As described below with reference to FIG. 9, the system 800, 900 then may perform a failover (1250).

Figure 9:
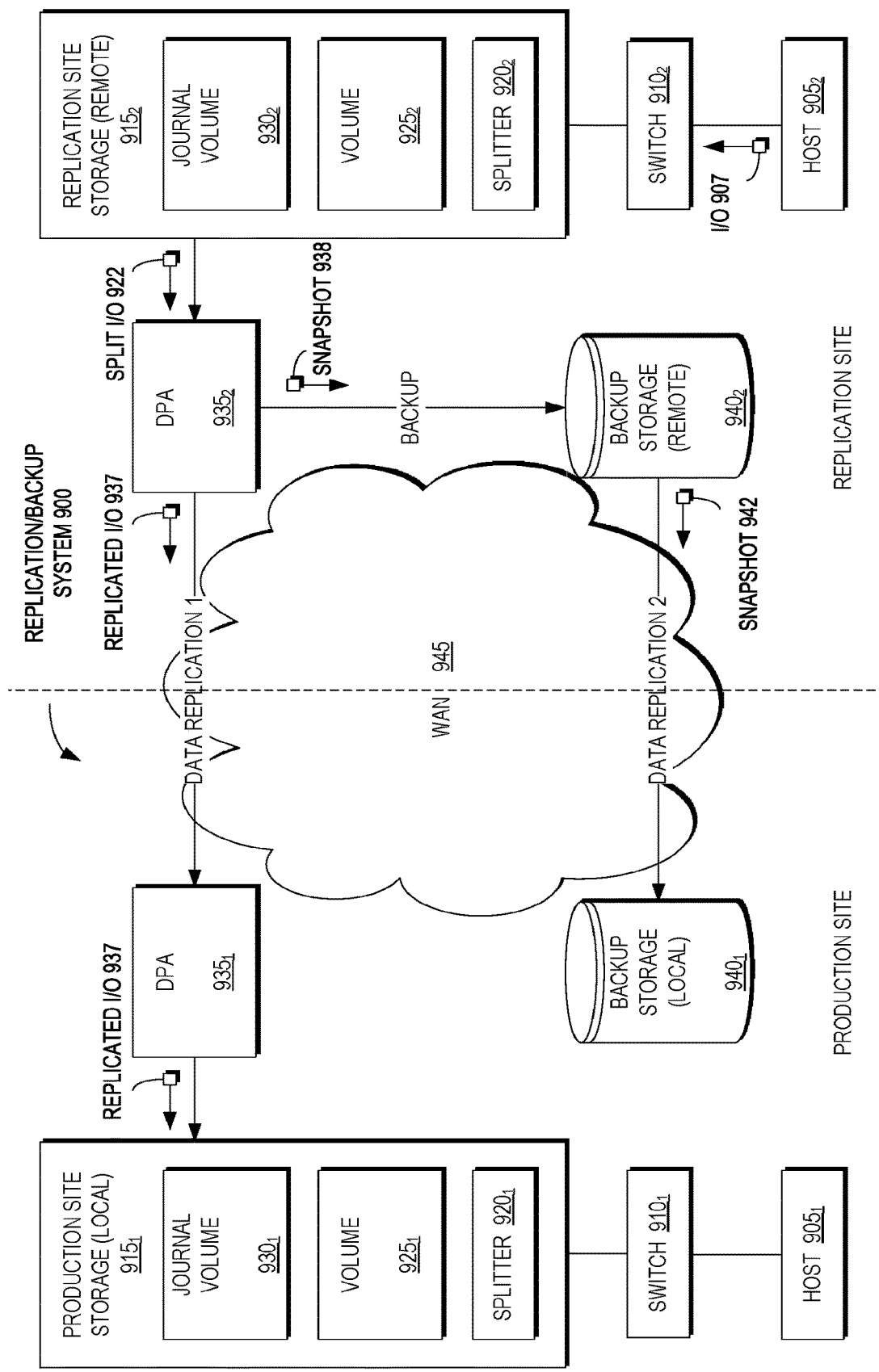
FIG. 9 is a block diagram illustrating determining differences between a production site storage and a replication site storage, between the production site storage and a production site backup storage, and between the production site backup storage and a backup site backup storage while performing failover in the system of FIG. 8 according to an example embodiment of the present invention.

FIG. 9 is a block diagram of a system 900 (e.g., the system 800 of FIG. 8) for performing a first failover data replication and a second failover data replication according to an example embodiment of the present invention. As illustrated in FIGS. 9 and 12, if the production site fails, a failover may be performed to the replication site so the flow of data replication is a first failover replication from the replication site storage $915_2$ to the production site storage $915_1$ (i.e., from the replication site DPA $935_2$ to the production site DPA $935_1$) (1255). However, it is also desirable to perform a second backup from the old replication site storage $915_2$ (i.e., the new failover production site storage $915_2$) replicate to the backup site backup storage $940_2$ (1260) similar to how, in FIG. 8, the production site storage $815_1$ backs up to the production site backup storage $840_1$ (i.e., first backup 1210 of FIG. 12). Similarly, the old backup site backup storage $940_2$ (i.e., the new failover production site backup storage) may replicate in a second failover replication to the old production site backup storage $940_1$ (i.e., the new backup site backup storage) (1265).

It is desirable for the failover procedure to be as fast as possible and not require a full sweep of the volume. However, the challenge is that the system 900 employs two separate replication engines (i.e., technologies) as described above and the data available on the data at the replication site and the backup site may not necessarily be coherent with the data at the production site. In most embodiments, the data at the backup site backup storage $840_2$ will be older as the production site DPA $835_1$ updates the production site backup storage $840_1$ periodically (e.g., every six hours) and then the production site backup storage $840_1$ performs the asynchronous second data replication to the backup site backup storage $840_2$. Further, it should be understood that the synchronous or asynchronous continuous (i.e., continuous but with a lower RPO) first data replication typically uses a high capacity WAN connection and the asynchronous second data replication typically does not require as much capacity so, on the replication site, the replication site storage $915_2$ may be updated by the DPA $935_2$ but the backup site backup storage $940_2$ may still have an older file (or the most recent file may still be in flight from the production site backup storage $940_1$ to the backup site backup storage $940_2$). Alternatively, the backup site backup storage $940_2$ may be more updated than the replication site storage $915_2$ if communications for the synchronous or asynchronous continuous first data replication fail between the DPAs $935_1$, $935_2$ but the asynchronous second data replication may still perform.

Accordingly, in order for the replication site DPA $935_2$ to be able to perform a backup of the replication site storage $915_2$ to the backup site backup storage $940_2$, the system 900 needs to determine the differences between the replication site storage $915_2$ and the backup site backup storage $940_2$ for replication to continue. Therefore, after failover, the replication site storage $915_2$ may attempt to create a snapshot and, via the replication site DPA $935_2$, push that snapshot to the backup site backup storage $940_2$ (or alternatively perform continuous replication to the backup device as described in FIGS. 3-7). However, as discussed above, there may be an image that has not yet arrived from the production site backup storage $940_1$ to the backup site backup storage $940_2$ (i.e., the image may be in process/in flight from the production site backup storage $940_1$). For example, the production site backup storage $940_1$ may have a snapshot that is two hours old and the backup site backup storage $940_2$ may have a snapshot that is eight hours old, with the snapshot that is two hours old not having yet arrived from the production site backup storage $940_1$ to the backup site backup storage $940_2$. Further, it should be noted that the replication site DPA $935_2$ may have a replication point objective (RPO) of three seconds, so when a failover is performed all the data that changed in replication site storage $915_2$ in the last eight hours needs to be copied because the backup site backup storage $940_2$ is at a point in time that is eight hours old.

Figure 10:
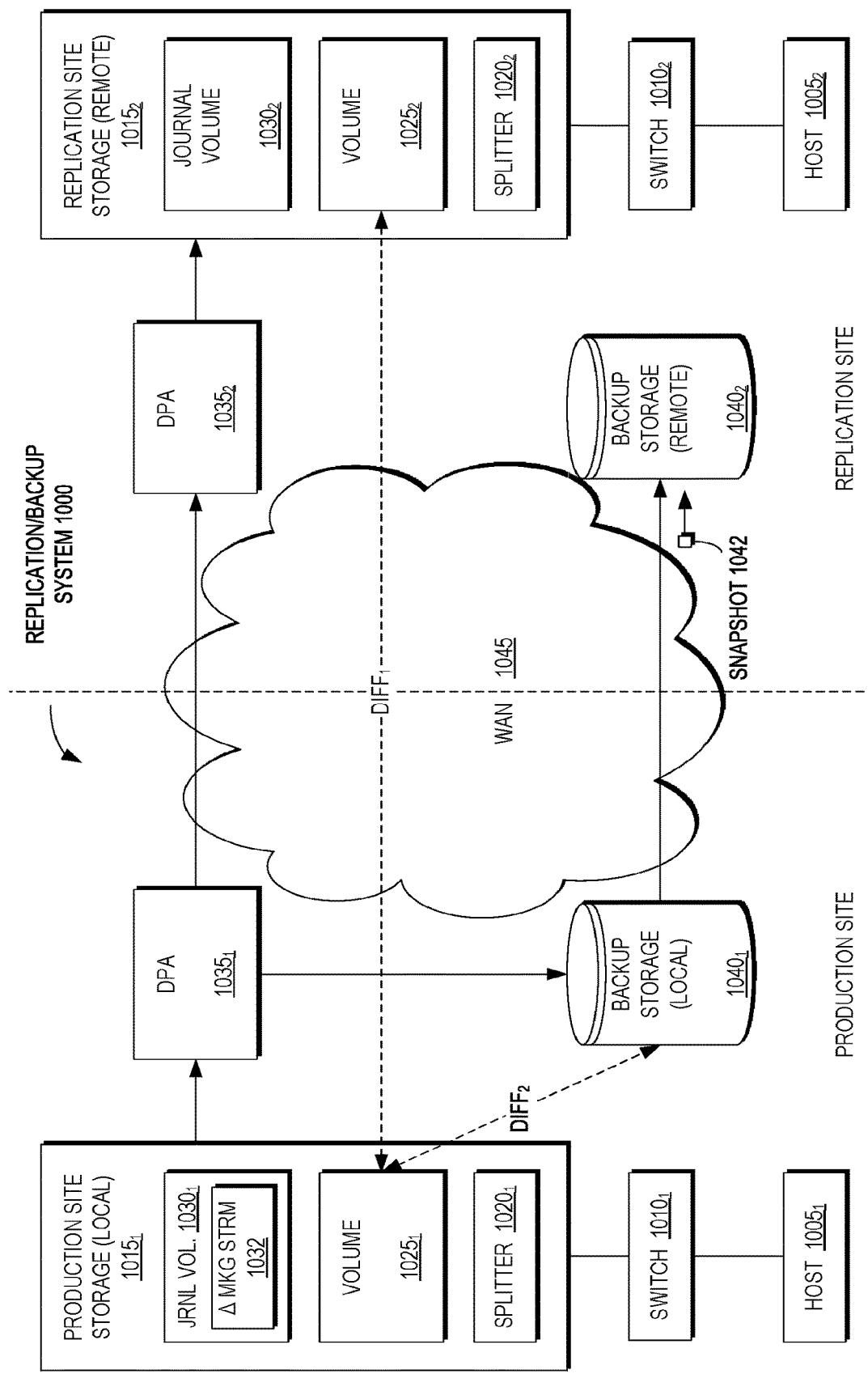
FIG. 10 is a block diagram illustrating determining differences between a production site storage and a replication site storage and between the production site storage and a production site backup storage and waiting for a backup to complete from the production site backup storage to a backup site backup storage while performing failover in the system of FIG. 8 according to an example embodiment of the present invention.
Figure 11:
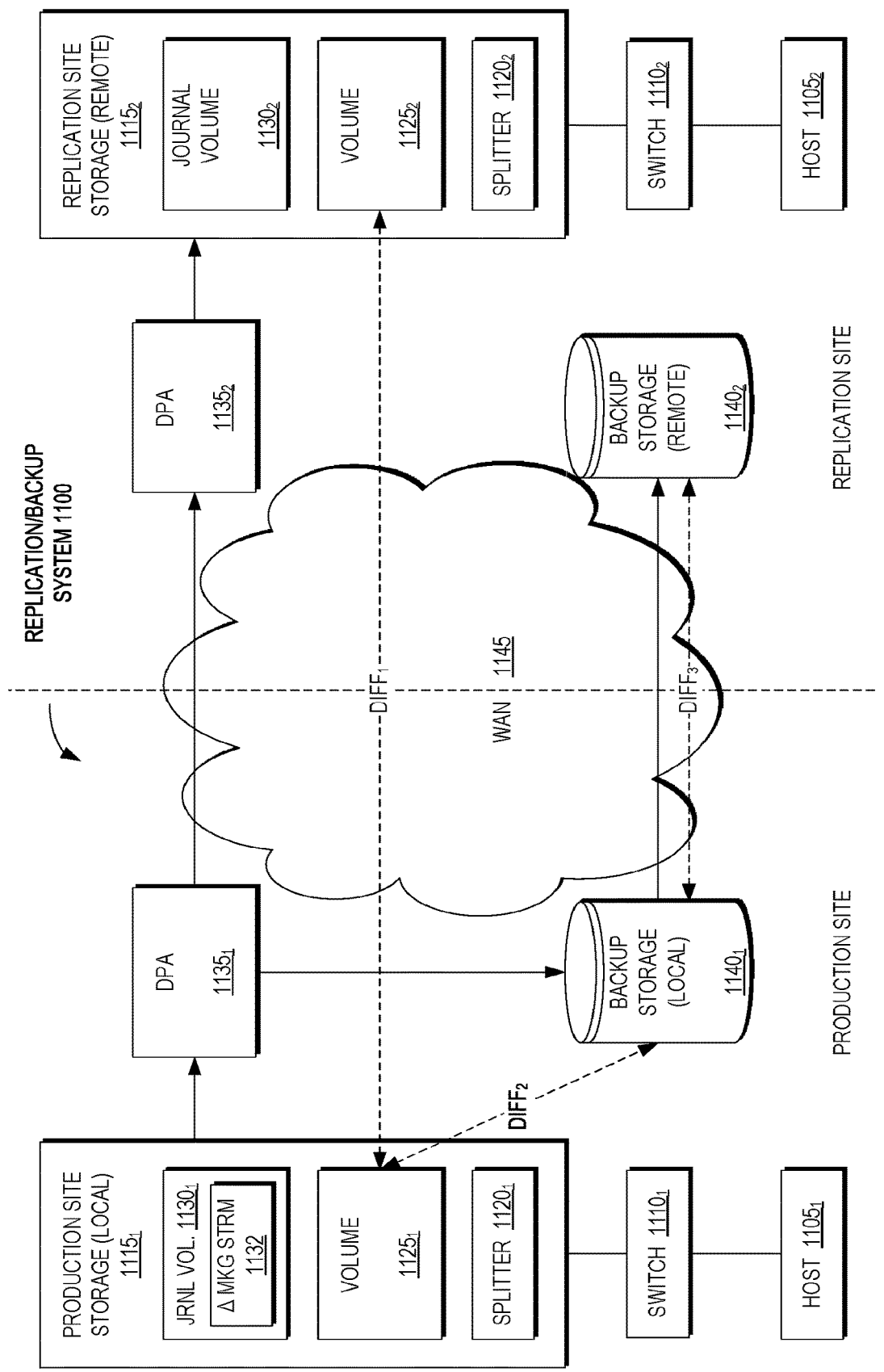
FIG. 11 is a block diagram of the system of FIG. 8 for performing a first failover data replication and a second failover data replication according to an example embodiment of the present invention.
Figure 13:
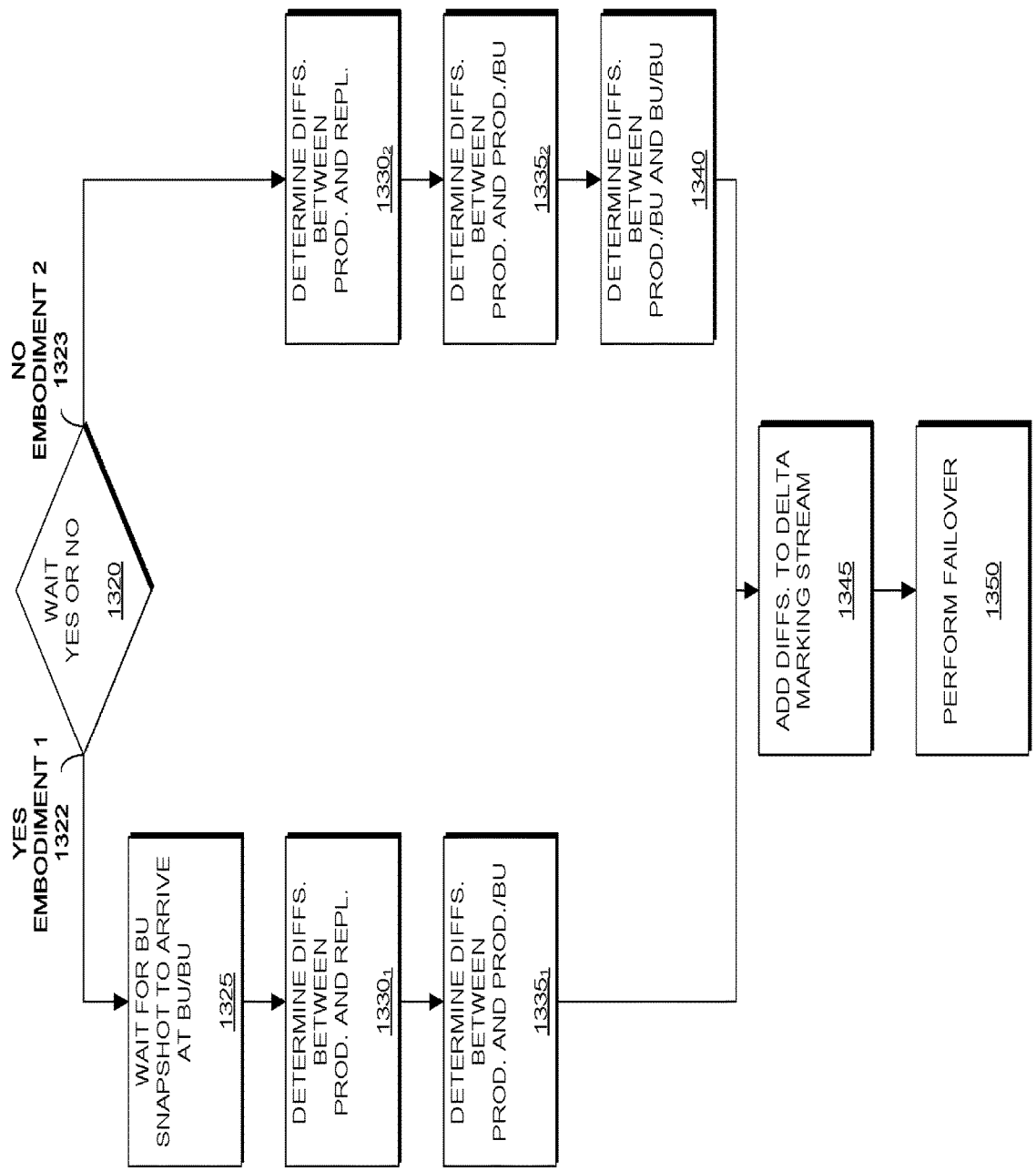
FIG. 13 is a flow diagram illustrating alternative methods for performing failover in the system of FIG. 8 according to respective example embodiments of the present invention.

FIGS. 10 and 11 are block diagrams illustrating alternative embodiments of determining the differences between the replication site storage (e.g., replication site storage $915_2$ of FIG. 9) and the backup site backup storage (e.g., backup site backup storage $940_2$ of FIG. 9). FIG. 13 is a flow diagram illustrating these alternative methods for performing failover in the system of FIG. 8 according to respective example embodiments of the present invention. FIGS. 10 and 11 each may be described in conjunction with FIG. 13.

As illustrated in FIG. 13, the system 1000, 1100 may wait (1320) for the latest backup from the production site backup storage $940_1$ to arrive at the backup site backup storage $940_2$. As illustrated in FIGS. 9, 10, and 13, in a first embodiment, the system 1000 may perform the failover to the replication site and wait (1322) for the latest backup from the production site backup storage $940_1$ to arrive at the backup site backup storage $940_2$ before processing I/Os 907 from the replication site host $905_2$. Alternatively, as illustrated in FIGS. 9, 11, and 13, in a second embodiment, the system 1100 may perform the failover to the replication site and begin processing I/Os 907 from a replication site host $905_2$ without waiting (1323) for the latest backup from the production site backup storage $940_1$ to arrive at the backup site backup storage $940_2$.

FIG. 10 is a block diagram illustrating performing failover in the system 1000 (e.g., system 800 of FIG. 8) and waiting for a backup to complete from the production site backup storage $1040_1$ to a backup site backup storage $1040_2$ according to an example embodiment of the present invention. As illustrated in FIGS. 10 and 13, the system 1000 may wait (1325) for the latest snapshot 1042 to arrive from the production site backup storage $1040_1$ to the backup site backup storage $1040_2$ before completing the failover. The system 1000 then may determine a first set of differences between a production site storage $1015_1$ and a replication site storage $1015_2$ ($1330_1$) and determine a second set of differences between the production site storage $1015_1$ and a production site backup storage $1040_1$ ($1335_1$).

FIG. 11 is a block diagram illustrating performing failover in the system 1100 (e.g., system 800 of FIG. 8) without waiting for a backup to complete from the production site backup storage $1140_1$ to a backup site backup storage $1140_2$ according to an example embodiment of the present invention. As illustrated in FIGS. 11 and 13, the system 1100 may determine a first set of differences between a production site storage $1115_1$ and a replication site storage $1115_2$ ($1330_2$) and determine a second set of differences between the production site storage $1115_1$ and a production site backup storage $1140_1$ ($1335_2$). The system 1100 also may determine a third set of differences between the production site backup storage $1140_1$ and the backup site backup storage $1140_2$ (1340).

As illustrated in FIGS. 10, 11, and 13, the system 1000, 1100 may take all the differences (e.g., the first and second sets of differences with reference to FIG. 10 and the first, second, and third sets of differences with reference to FIG. 11)

It should be understood that the production site DPA $1035_1$, $1135_1$ may determine the first set of differences between the production site storage $1015_1$, $1115_1$ and the replication site storage $1015_2$, $1115_2$ according to a delta marking stream 1032, 1132 stored in the production site journal volume $1030_1$, $1130_1$. Similarly, the production site DPA $1035_1$, $1135_1$ may determine the second set of differences between the production site storage $1015_1$, $1115_1$ and the production site backup storage $1040_1$, $1140_1$ as the next set of changes that need to be sent to the production site backup storage $1040_1$, $1140_1$ for backup, or as the list of IOs in the last portion of the journal in case of backing up continuously to the backup device as described in FIGS. 3-7.

To determine the third set of differences between the production site backup storage $1140_1$ and the backup site backup storage $1140_2$, the production site DPA $1135_1$ may query the production site backup storage $1140_1$ to identify the latest version of the backup file which was transferred to the backup site backup storage $1140_2$, such as via an API. It should be understood that the latest transferred backup files are still stored at the production site backup storage $1140_1$, so the production site DPA $1135_1$ may use a differences API to determine which blocks were not transferred yet to the backup site backup storage $1140_2$ and add them to the delta marking stream 1132 containing the differences between the latest copy of the backup file at the backup site backup storage $1140_2$ and the latest copy of the backup file at the production site backup storage $1140_1$ (i.e., the changes at the production site storage $1115_1$ not yet backed up to the production site backup storage $1140_1$).

With the accumulated differences now available, failover replication may begin from the failover production site (i.e., the old replication site) to the failover replication site (i.e., the old production site) and the accumulated differences then may be shipped to the backup site backup storage $1040_2$, $1140_2$.

We will also add the diff between the production volume on the primary storage and the latest copy shipped to Data-Domain to the list and the diff between the replica copy at the replica primary array and the production copy at the primary array to this diff list.

Figure 14:
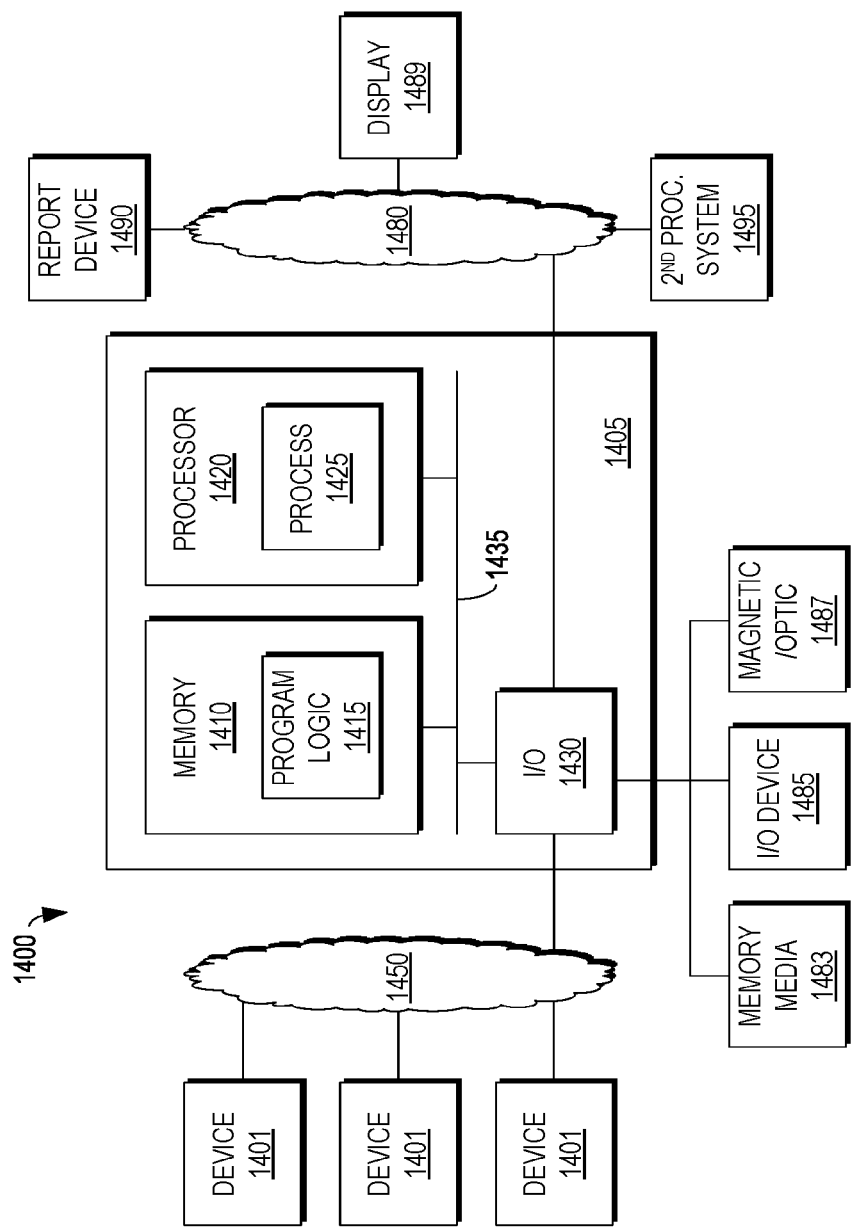
FIG. 14 is a block diagram illustrating an apparatus according to an example embodiment of the present invention.

FIG. 14 is a block diagram of an example embodiment apparatus 1405, such as a general purpose computer, according to an example embodiment of the present invention. The apparatus 1405 may be part of a system 1400 and includes memory 1410 storing program logic 1415, a processor 1420 for executing a process 1425, and a communications I/O interface/controller 1430, connected via a bus 1435. Some embodiments may comprise multiple processors or a processor with multiple cores. Processor 1420 and memory 1410 may together execute a computer process, such as the processes described herein.

System I/O controller 1430 may be in communication with display 1489, I/O device 1485, non-transitory computer readable storage medium 1483, 1487, and/or network 1450. Display 1489 may be any computer display, such as a monitor, a smart phone screen, or wearable electronics and/or it may be an input device such as a touch screen. Input/output device 1485 may be a keyboard, mouse, trackpad, camera, microphone, or the like, and storage medium 1483, 1487 may comprise a hard drive, flash drive, solid state drive, magnetic tape, magnetic disk, optical disk, or any other computer readable and/or writable medium. Storage device 1483, 1487 may also reside inside general purpose computer 1405, rather than outside as shown in FIG. 14.

The network 1450 may be any computer network, such as a local area network (LAN), wide area network (WAN) such as the internet, a corporate intranet, a metropolitan area network (MAN), a storage area network (SAN), a cellular network, a personal area network (PAN), or any combination thereof. Further, the network 1450 may be either wired or wireless or any combination thereof, and may provide input to or receive output from I/O controller 1430. In an embodiment, the network 1450 may be in communication with one or more network connected devices 1401, such as another general purpose computer, smart phone, PDA, storage device, tablet computer, or any other device capable of connecting to a network.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 14, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 15:
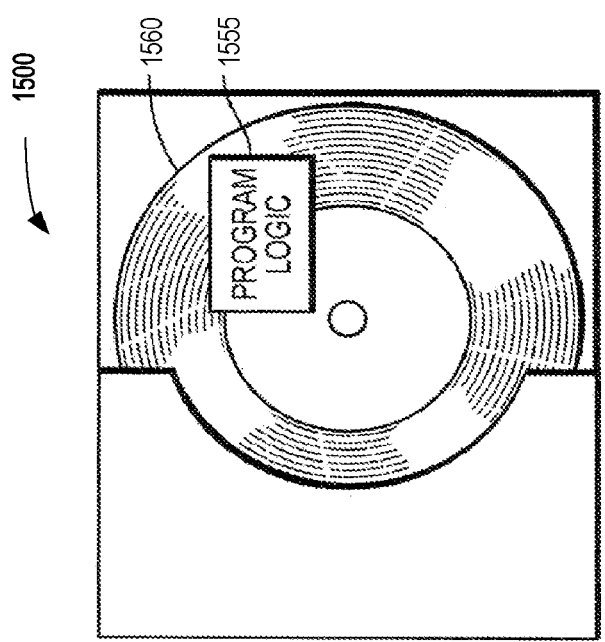
FIG. 15 is a block diagram illustrating an example embodiment of the present invention embodied in computer program code.

FIG. 15 is a block diagram of a computer program product 1500 including program logic 1555, encoded on a computer-readable medium 1560 in computer-executable code configured for carrying out the methods of the invention, according to an example embodiment of the present invention. The logic for carrying out the method may be embodied as part of the aforementioned system, which is useful for carrying out a method described with reference to embodiments shown.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the sake of clarity, the processes and methods herein have been illustrated with a specific flow, but it should be understood that other sequences may be possible and that some may be performed in parallel, without departing from the spirit of the invention. Additionally, steps may be subdivided or combined. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
   replicating a production site to a replication site;
   replicating a backup of the production site from a local backup storage associated with the production site to a remote backup storage associated with the replication site;
   performing a failover such that the replication site becomes a current production site, the production site becomes the current replication site, the local backup storage becomes a current remote backup storage, and the remote backup storage associated with the replication site becomes the current local backup storage;
   updating the current local backup storage based on the current production site;
   replicating the current production site to the current replication site; and
   replicating the current local backup storage to the current remote backup storage, wherein replication from the production site to the replication site is faster than replication from the local backup storage associated with the production site to the remote backup storage associated with the replication site.

2. The method of claim 1, further comprising replicating the production site to the local backup storage associated with the production site.

3. The method of claim 1, further comprising determining differences between the current production site and the current local backup storage prior to updating the current local backup storage.

4. The method of claim 1, further comprising waiting for a most recent snapshot of the local backup storage associated with the production site before completing the failover.

5. The method of claim 4, further comprising determining first differences between the current production site and the current replication site and determining second differences between the local backup storage associated with the production site and the local backup storage associated with the replication site.

6. The method of claim 5, further comprising adding the first and second differences to a delta marking stream and finishing the failover.

7. The method of claim 1, performing the failover without waiting for a most recent snapshot of the local backup storage associated with the production site.

8. The method of claim 7, further comprising determining first differences between the current production site and the current replication site and determining second differences between the local backup storage associated with the production site and the local backup storage associated with the replication site and determining third differences between local backup storage associated with the production site and the remote backup storage associated with the replication site.

9. The method of claim 8, further comprising adding the first and second and third differences to a delta marking stream and finishing the failover.

10. A non-transitory storage medium having stored therein instructions that are executable by one or more hardware processors to perform operations comprising:
    replicating a production site to a replication site;
    replicating a backup of the production site from a local backup storage associated with the production site to a remote backup storage associated with the replication site;
    performing a failover such that the replication site becomes a current production site, the production site becomes the current replication site, the local backup storage becomes a current remote backup storage, and the remote backup storage associated with the replication site becomes the current local backup storage;
    updating the current local backup storage based on the current production site;
    replicating the current production site to the current replication site; and
    replicating the current local backup storage to the current remote backup storage, wherein replication from the production site to the replication site is faster than replication from the local backup storage associated with the production site to the remote backup storage associated with the replication site.

11. The non-transitory storage medium of claim 10, the operations further comprising replicating the production site to the local backup storage associated with the production site.

12. The non-transitory storage medium of claim 10, the operations further comprising determining differences between the current production site and the current local backup storage prior to updating the current local backup storage.

13. The non-transitory storage medium of claim 10, the operations further comprising waiting for a most recent snapshot of the local backup storage associated with the production site before completing the failover.

14. The non-transitory storage medium of claim 13, the operations further comprising determining first differences between the current production site and the current replication site and determining second differences between the local backup storage associated with the production site and the local backup storage associated with the replication site.

15. The non-transitory storage medium of claim 14, the operations further comprising adding the first and second differences to a delta marking stream and finishing the failover.

16. The non-transitory storage medium of claim 10, the operations performing the failover without waiting for a most recent snapshot of the local backup storage associated with the production site.

17. The non-transitory storage medium of claim 16, the operations further comprising determining first differences between the current production site and the current replication site and determining second differences between the local backup storage associated with the production site and the local backup storage associated with the replication site and determining third differences between local backup storage associated with the production site and the remote backup storage associated with the replication site.

18. The non-transitory storage medium of claim 17, the operations further comprising adding the first and second and third differences to a delta marking stream and finishing the failover.

* * * * *